United States Patent
Liu et al.

(10) Patent No.: US 11,948,031 B2
(45) Date of Patent: Apr. 2, 2024

(54) METHOD AND DEVICE FOR AUTHENTICATING PASSIVE RFID TAG

(71) Applicants: NANJING UNIVERSITY, Nanjing (CN); JIANGSU TOOKER ROBOTICS CO., LTD., Suzhou (CN)

(72) Inventors: Jia Liu, Nanjing (CN); Lijun Chen, Nanjing (CN); Dong Jiang, Nanjing (CN); Xingyu Chen, Nanjing (CN)

(73) Assignees: NANJING UNIVERSITY, Jiangsu (CN); JIANGSU TOOKER ROBOTICS CO., LTD., Jiangsu (CN)

( * ) Notice: Subject to any disclaimer, the term of this patent is extended or adjusted under 35 U.S.C. 154(b) by 29 days.

(21) Appl. No.: 17/787,482

(22) PCT Filed: Feb. 22, 2020

(86) PCT No.: PCT/CN2020/076307
§ 371 (c)(1),
(2) Date: Jun. 20, 2022

(87) PCT Pub. No.: WO2021/164039
PCT Pub. Date: Aug. 26, 2021

(65) Prior Publication Data
US 2023/0051005 A1    Feb. 16, 2023

(51) Int. Cl.
*G06K 19/07*        (2006.01)
*H04L 9/32*         (2006.01)

(52) U.S. Cl.
CPC .......... *G06K 19/0723* (2013.01); *H04L 9/32* (2013.01); *H04L 2209/805* (2013.01)

(58) Field of Classification Search
CPC ........ G06K 19/0723; G06K 7/10; H04L 9/32; H04L 2209/805; H04L 9/3231; H04L 9/0866
See application file for complete search history.

(56) References Cited

U.S. PATENT DOCUMENTS 9,036,891 B2 * 5/2015 Cobb ................. G06K 19/0718
                                                    713/193
9,330,284 B1    5/2016 Diorio
(Continued)

FOREIGN PATENT DOCUMENTS

CN    102904724 A      1/2013
CN    103345648 A  * 10/2013
CN    104077551 A    10/2014

OTHER PUBLICATIONS

A RFID tag device fingerprint authentication system, 5 pages. (Year: 2023).*

(Continued)

*Primary Examiner* — Tuyen K Vo
(74) *Attorney, Agent, or Firm* — SZDC Law PC

(57) ABSTRACT

A method for authenticating a passive RFID tag includes acquiring a tag fingerprint of a first tag as a first tag fingerprint, the first tag being the genuine tag; acquiring a tag fingerprint of a second tag as a second tag fingerprint, the second tag being the tag to be authenticated; comparing the first tag fingerprint with the second tag fingerprint: if the first tag fingerprint is consistent with the second tag fingerprint, determining that the second tag is a genuine tag, otherwise determining the second tag is a forged tag. The tag fingerprint is the persistence time enabling the passive RFID tag to operate normally during discharge after fully charging. The beneficial effects include being high in robustness to the change of environment and high in authentication accuracy and capable of being directly deployed on an existing commercial RFID device without modifying hardware of the tag and reader.

12 Claims, 13 Drawing Sheets

(56) References Cited

U.S. PATENT DOCUMENTS

| | | | | |
|---|---|---|---|---|
| 10,958,665 B2* | 3/2021 | Plouchart | ................ | H04L 63/08 |
| 2011/0248827 A1* | 10/2011 | Bertoncini | ............ | H04L 9/3226 |
| | | | | 340/10.1 |
| 2016/0226892 A1* | 8/2016 | Sen | ....................... | H04W 12/02 |

OTHER PUBLICATIONS

Jinsong Han et al., "GenePrint: Generic and Accurate Physical-Layer Identification for UHF RFID Tags" IEEE / ACM Transactions on Networking, vol. 24, No. 2, pp. 846-858 (Apr. 30, 2016).

Senthilkumar Chinnappa Gounder Periaswamy et al., "Fingerprinting RFID Tags" IEEE Transactions on Dependable and Secure Computing, vol. 8, No. 6, pp. 938-943 (Oct. 21, 2010).

\* cited by examiner

METHOD AND DEVICE FOR AUTHENTICATING PASSIVE RFID TAG

This application is the National Stage Application of PCT/CN2020/076307, filed on Feb. 22, 2020, which is incorporated by reference for all purposes as if fully set forth herein.

FIELD OF THE INVENTION

The present invention relates to the field of radio frequency identification (RFID), in particular to a method and device for authenticating a passive RFID tag.

BACKGROUND OF THE INVENTION

RFID (Radio Frequency Identification) is a non-contact automatic identification technology, which is the basis and core of realizing the "connection of things" in the Internet of Things. At present, this technology is widely used in various fields of society, such as mobile payment, identity authentication, logistics and warehousing. There are two types of RFID tags: active tags and passive tags, which are classified depending on whether they have batteries. Relatively speaking, the passive tags are favored by the market because of their good features including low cost, long service life, and easy-to-maintain.

However, the widespread use of the passive tags also brings new challenges. Low-cost passive tags are difficult to afford reliable encryption algorithms, such that the user privacy data stored in the tags are easy to be obtained by attackers. Attackers can write these data into their own forged tags for the forgery of documents and commodities. These forged tags have exactly the same data as the real tags, and are difficult to be discovered by existing RFID systems, resulting in serious economic losses and security risks.

In order to solve the problem that the data of the passive tags are easy to be attacked and obtained, the recent work adopts the physical-layer identification (PLI) technology, which uses the difference of RF signals as the tag fingerprint to identify the authenticity of the tags. However, it is difficult to apply PLI to practical applications, because using PLI requires dedicated equipment to extract signal features, and some PLI-based methods are very vulnerable to environmental changes.

CONTENTS OF THE INVENTION

In order to overcome the problem that the passive RFID tags are difficult to be authenticated in the prior art, the present invention provides a method and device for authenticating the passive RFID tags, which can be used on commercial RFID devices conforming to ISO standards, with no need for any hardware modifications and regardless of external environmental factors.

Based on the above object, the technical solution of the present invention is as follows:

A method for authenticating passive RFID tags is provided, comprising the following steps: acquiring a tag fingerprint of the first tag as the first tag fingerprint and, the first tag is treated as the genuine tag; acquiring a tag fingerprint of the second tag as the second tag fingerprint, and the second tag is the tag to be authenticated; comparing the first tag fingerprint with the second tag fingerprint: if the first tag fingerprint is consistent with the second tag fingerprint, determining that the second tag is a genuine tag, otherwise determining that the second tag is a forged tag. The tag fingerprint is the time span from the initial supply voltage when the RC circuit of a tag is fully charged decaying to a very low level that cannot afford the tag to run properly, which is referred to as power-off maintenance time.

Preferably, the power-off maintenance time is determined by measuring of the persistence time that enables the volatile memory of a tag to maintain its stored information.

The persistence time can be measured as follows:

(1) We use a reader to write some data into the volatile memory of a tag and the tag requires power to maintain the stored data; we turn off the reader and wait for a period of time t before querying the data in the volatile memory: if the data change, the current waiting time t is taken as the persistence time; if the data remain unchanged, the waiting time t is updated with the step length $\Delta t$; this process repeats until the persistence time corresponding to the data change is acquired.

(2) We use a reader to write some data into the volatile memory of multiple target tags and the tags require power to maintain the stored data; we turn off the reader and wait for a period of time t before querying the data in the volatile memory of these tags: if the data of a tag change, the current waiting time t is taken as the persistence time of this tag; if the data remain unchanged or there are still tags with data unchanged, the waiting time t is updated with the step length $\Delta t$; this process repeats until the persistence time of all tags are acquired.

When the volatile memory is the inventoried flag in the S1 session (S1 inventoried flag), we can measure the persistence time within only one time window, thereby saving a lot of communication overhead. This can be implemented as follows:

(1) We use a reader to write some data into the volatile memory of a tag; the reader collects the data in the volatile memory: if the data change, the current time span is taken as the persistence time; if the data remain unchanged, the reader keeps querying the tag until the data change. The time span is treated as the persistence time of this tag.

(2) We use a reader to write some data into the volatile memory of multiple target tags; the reader collects the data in the volatile memory of these tags: if the data of a tag change, the current time span is taken as the persistence time of this tag; if the data remain unchanged or there are still tags with data unchanged, the reader keeps querying until the persistence time of all tags are obtained.

In order to improve the authentication accuracy of the tags, several persistence times corresponding to multiple different volatile memories can be used as different tag fingerprints for authentication, and the second tag is determined to be a genuine tag only when all these tag fingerprints match those of the first tag.

In order to prevent the jitter of a single fingerprint from affecting the authentication accuracy, the present invention can also use a fingerprint set to verify the authenticity of the tag. The authentication method comprises the following steps: acquiring the tag fingerprint of the first tag multiple times to obtain multiple fingerprints, so as to form the fingerprint set of the first tag; acquiring the tag fingerprint of the second tag multiple times to obtain multiple fingerprints, so as to form the fingerprint set of the second tag; comparing the first tag fingerprint set with the second tag fingerprint set: if the first tag fingerprint set is consistent with the second tag fingerprint set, the second tag is considered as a genuine, otherwise the second tag is a forged tag.

For the comparison between the first tag fingerprint set and the second tag fingerprint set, a t-test or a Mann-Whitney U test can be used, or the mean of the elements in the first tag fingerprint set can be directly compared with the mean of the elements in the second tag fingerprint set.

When there are multiple genuine tags, in order to improve the authentication efficiency of the tags, the present invention can also use both the tag ID and the tag fingerprint as the feature of the tags for authentication. The authentication method comprises the following steps: respectively acquiring the ID and tag fingerprint (or tag fingerprint set) of each first tag to form multiple groups of corresponding first tag IDs and first tag fingerprints (or first tag fingerprint sets); acquiring the ID of the second tag as a second tag ID; determining whether there is the second tag ID in the first tag ID before comparing the tag fingerprints: if there is not, determining that the second tag is a forged tag, otherwise acquiring the first tag fingerprint (or the first tag fingerprint set) corresponding to the second tag ID and comparing it with the second tag fingerprint (or the second tag fingerprint set).

Accordingly, the present invention also provides a device for authenticating the passive RFID tags; the device includes a reader and a server, wherein the server communicates with the reader so that the device can perform the aforementioned authentication method.

The present invention has the following beneficial effects:

The present invention is high in robustness to the change of environment and high in authentication accuracy and capable of being directly deployed on an existing commercial RFID device without modifying hardware of the tag and the reader.

The specific examples of the present invention will be described below in detail with reference to the accompanying drawings, so that the above and other objects, advantages and features of the present invention will be more clearly understood by those skilled in the art.

BRIEF DESCRIPTION OF THE DRAWINGS

Some specific examples of the present invention will be described below in detail in an exemplary rather than restrictive manner with reference to the accompanying drawings. The same reference numbers in the drawings designate the same or similar components or parts. It will be understood by those skilled in the art that these drawings are not necessarily drawn to scale. In the drawings.

DETAILED DESCRIPTION OF THE EMBODIMENTS

In order to make the above objects, features and advantages of the present invention more obvious and easy to understand, the specific embodiments of the present invention will be described below in detail with reference to the accompanying drawings. Many specific details are set forth below to facilitate a full understanding of the present invention; however, the present invention can be implemented in many other ways than those described herein, and those skilled in the art can make similar improvements without departing from the spirit of the present invention. Therefore, the present invention is not limited by the specific examples disclosed hereinafter.

An RFID system typically comprises an RFID reader, an antenna and an RFID tag, where a passive RFID tag does not have any built-in power source. The reader releases a carrier wave through the antenna to communicate with the tag within a certain range, and the passive RFID tag continuously draws energy from the carrier wave released by the reader; in order to ensure reliable and continuous operation, the tag needs to store some electrical energy in its chip, which is equivalent to a resistor-capacitor (RC) charging circuit.

Figure 1:
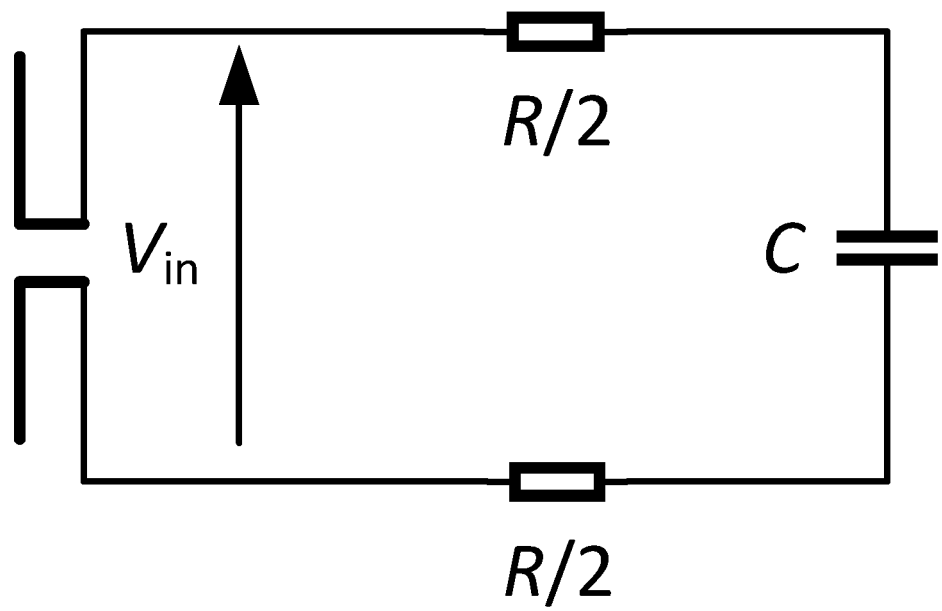
FIG. 1 is an equivalent circuit diagram of the charging process of a passive RFID tag chip.
Figure 2:
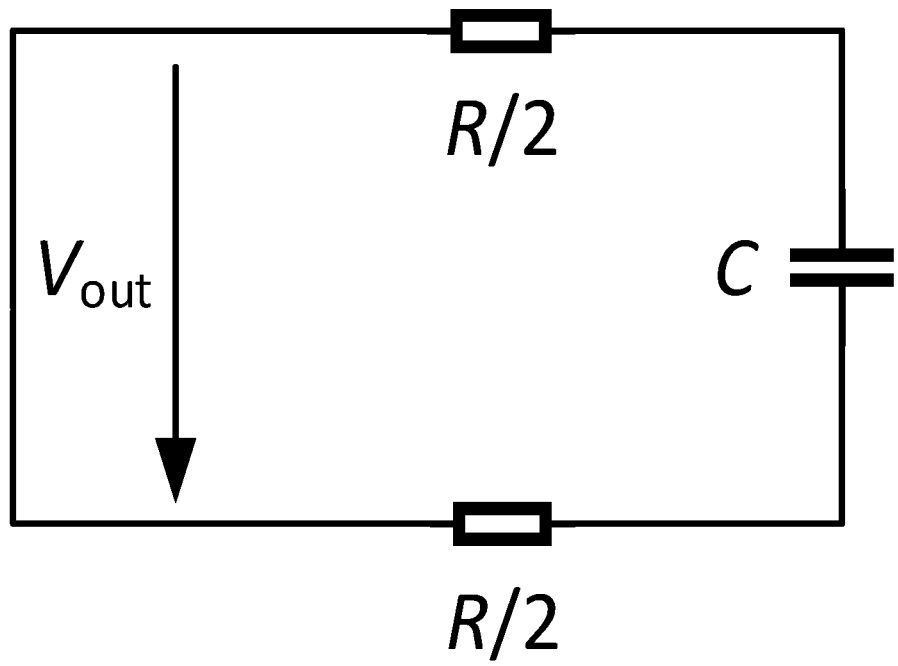
FIG. 2 is an equivalent circuit diagram of the discharging process of the passive RFID tag chip.

FIG. 1 is an equivalent circuit diagram of the charging process of the passive RFID tag chip, where R is the resistance of the tag chip, C is the capacitance of the tag chip, and $V_{in}$ is the rated voltage across the tag chip. The passive RFID tag continuously gets energy from the carrier wave to charge its own capacitor; after the charging process is completed, the voltage across the capacitor of the tag chip is equal to the input voltage $V_{in}$, such that no energy is got from the reader. According to the RFID standard, the charging process of the tag takes less than 2 ms; therefore, it can be considered that once the reader is turned on, all the tags within the interrogation range have been fully charged. As shown in FIG. 2, if the reader is turned off at this time, a current will be generated due to the potential difference across the capacitor, so that the voltage $V_{out}$ will continuously decrease with time. In this process, the capacitor acts as an auxiliary power supply to maintain the normal operation of the tag when the voltage $V_{out}$ is greater than a threshold $V_0$.

Due to manufacturing defects, it is impossible for two tags to have exactly the same RC circuit; by detecting this difference, we can fingerprint each tag from the perspective of the physical layer circuitry. In the present invention, the characteristics of the RC circuit are reflected by the persistence time T. The power-off maintenance time T refers to the time span during which the RC circuit decays from a fully charged state to a low level (this low level is the lowest voltage state required for the tag to function properly, i.e. the threshold $V_0$ as described above) when it is powered off after being fully charged. This parameter depends on the RC circuit itself. Based on the difference in the persistence time T, we can judge whether a tag is a forged tag or not by measuring the persistence time T of the tag.

The persistence time T is determined by the hardware of the tag, regardless of environmental factors (e.g. communication distance, tag location, and multipath effect). Therefore, compared with the existing fingerprint identification technology, using the persistence time T as the tag fingerprint can not only accurately reflect the physical layer RC circuit of the tag chip, but also have strong robustness to the change of environment.

Figure 3:
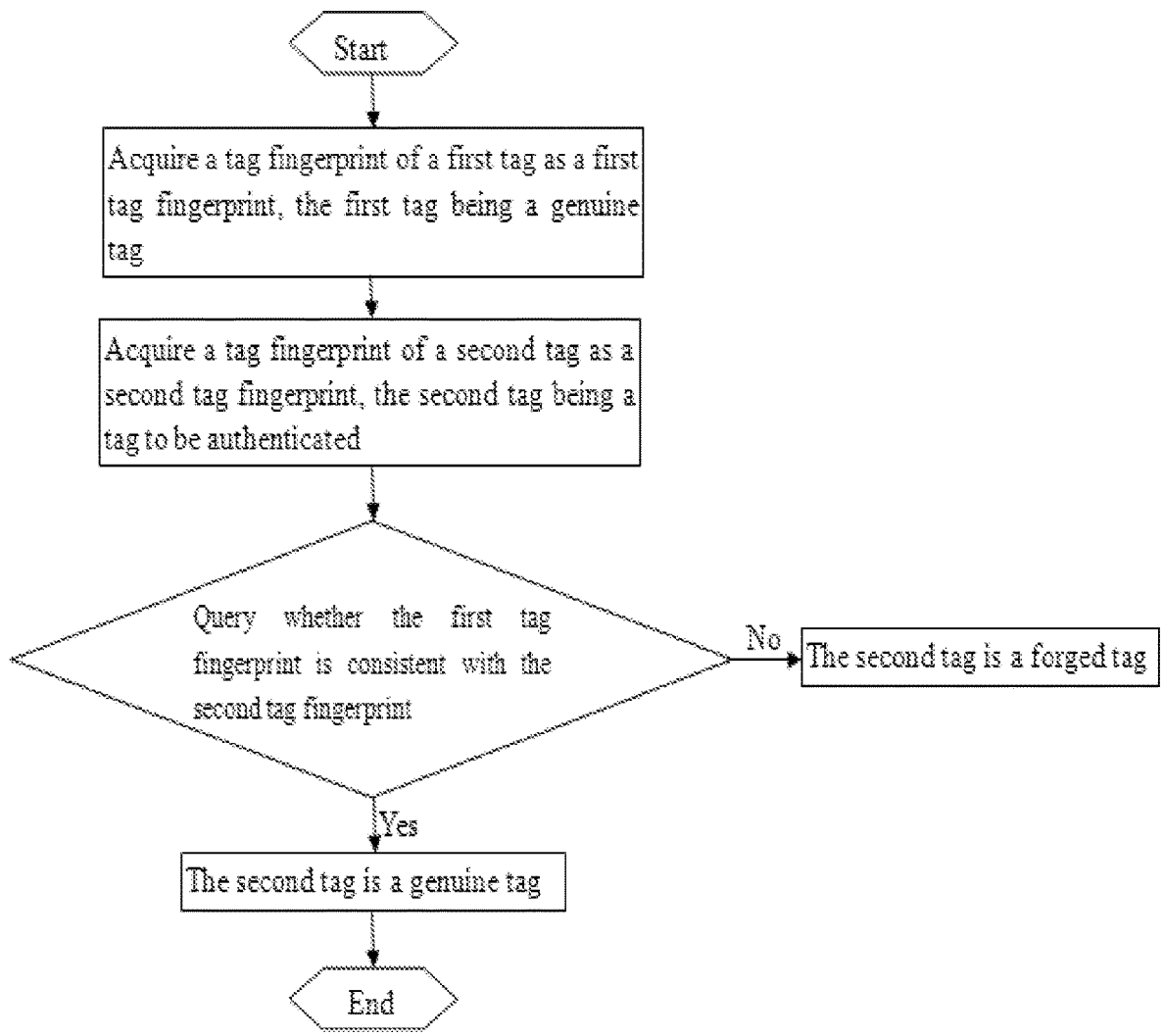
FIG. 3 is a flowchart of a method provided by an example of the present invention for authenticating the passive RFID tags.

A method provided by an example of the present invention for authenticating the passive RFID tags is shown in FIG. 3. The method comprises the following steps: acquiring a tag fingerprint of a first tag as a first tag fingerprint, the first tag being a genuine tag; acquiring a tag fingerprint of a second tag as a second tag fingerprint, the second tag being a tag to be authenticated; comparing the first tag fingerprint with the second tag fingerprint: if the first tag fingerprint is consistent with the second tag fingerprint, determining that the second tag is a genuine tag, otherwise determining that the second tag is a forged tag. The tag fingerprint is the persistence time enabling the passive RFID tag to operate normally during discharge after the completion of charging.

The first tag fingerprint and the second tag fingerprint can be compared in various ways to determine whether the two are consistent, e.g., comparing the absolute value of the difference between the two with the threshold, comparing the ratio of the absolute value of the difference between the two to the first tag fingerprint with the threshold, and so on.

Generally, in the discharge process of the RC circuit, the discharge voltage curve can be obtained by detecting the change in the voltage across the circuit, and then the time for the voltage $V_{out}$ to decay from $V_{in}$ to $V_0$, i.e. the persistence time T, can be achieved. However, this approach requires specialized equipment, which affects its applicability.

Preferably, the present invention uses the state presented by the flag of the tag as a reference for the electric quantity of the tag. Unlike a non-volatile memory (e.g. an NAND flash memory and a solid state drive), the flag of the tag is a volatile memory that requires power to keep the data stored therein, and once the power is cut off or the supply voltage falls below the threshold, the stored data will be quickly lost. For the passive RFID tag, once the reader is turned off, the power is cut off, and the RC circuit of the tag begins to discharge; when the output voltage $V_{out}$ of the RC circuit of the tag is less than $V_0$, the state of the flag of the tag will fall back to the default state. Therefore, by checking the state change of the flag, the time point at which the output voltage of the RC circuit decays to the threshold $V_0$ can be determined, and then persistence time T can be obtained. The state of the flag of the tag can be freely retrieved by all commercial readers, thereby ensuring the practicability of the fingerprint extracted by the present invention.

According to the production standards of the RFID tag, the RFID tag has five flags that are realized by the volatile memory and include one selected flag (SL flag) and four inventoried flags corresponding to four session domains (Sessions) S0, S1, S2 and S3.

Figure 4:
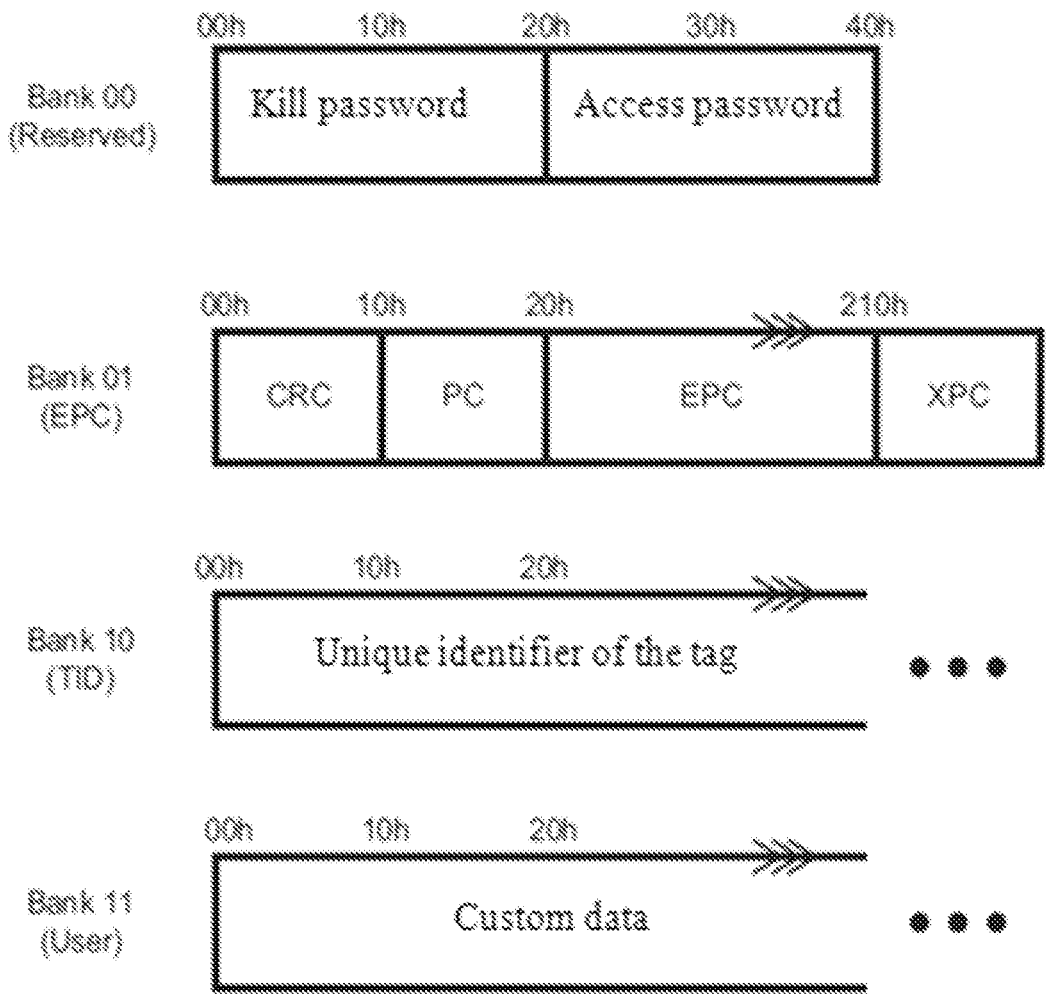
FIG. 4 shows the logical memory structure of the tags.

The standard specification of the RFID tag will be briefly introduced in the following. The internal storage space of the tag can be logically divided into four memories, namely Reserved Memory, EPC Memory, TID Memory and User Memory, as shown in FIG. 4.

Reserved Memory: The Reserved Memory, occupying a total of 64 bits, is used to store the kill password and access password of the tag, which are only used when the kill operation and encrypted access operation are performed on the tag.

EPC Memory: The first 32 bits in the EPC Memory are used to store the tag control information, which includes Cyclic Redundancy Check (CRC) results, Protocol Control (PC), and Extended Protocol Control (XPC) in sequence; immediately following the first 32 bits is a tag EPC (Electronic Product Code), which can be modified by users through programming to uniquely identify a tag, and generally has a length of 96 bits, or 128 bits or even 496 bits for some chips.

TID Memory: The TID Memory is used to store the tag manufacturer information, the tag type identification and the unique identification code, which is unique all over the world; unlike the EPC field, the TID is determined by the factory and cannot be modified by users.

User Memory: The User Memory provides a complete logical space for users to store their own information.

In addition to the unified design of logical memory banks, each tag simultaneously supports four session domains, which are represented by symbols S0, S1, S2 and S3, respectively. The tag will use one of the session domains in a cycle of communication with the reader, and multiple readers can use different session domains to communicate with the same tag at the same time. For example, while Reader 1 communicates with a tag by using Session S0, Reader 2 can also communicate with the tag by using Session S1.

Each session domain has a corresponding inventoried flag to reflect the current inventory state of the tag. The value of the inventoried flag is A or B, which will be affected by the command of the reader and the state change of the inventoried flag is called state flip. Each time the tag is queried by the reader, the flag of the current session domain will flip. The flip of the flag from A to B is recorded as A→B, and the flip of the flag from B to A is recorded as B→A. An important role of the session domain is to enable the tag to maintain an independent state (A or B) for each communication when communicating with multiple readers at the same time.

In addition to the four inventoried flag corresponding to the four session domains, each tag has a special flag—the selected flag (SL flag). The selected flag, similar in function to other inventoried flag, also has two opposite states, which are represented by SL and ~SL, respectively.

When the tag gains energy, the state of the 50 flag is always set to A, the state of the inventoried flag of the other session domains is initialized to A or B according to the command of the reader, and the state of the selected flag is initialized to SL or ~SL. When the tag is queried by the reader, the inventoried flag will always automatically flip to the opposite state to indicate that the tag has been inventoried. In addition to the automatic flipping of the flag after the tag is inventoried, each flag has a corresponding persistence time, i.e. the time that the tag can maintain the state of its own flag after losing the power supply of the carrier wave of the reader. Taking the inventoried flag as an example, in which the state B needs to be maintained at a high level, when the internal power of the tag is exhausted, the flag will be initialized to the state A, and the time span from the tag being disabled to B→A of the inventoried flag is the persistence time. The specific values are shown in Table 1. Once the persistence time expires when a tag is not energized, its flag will fall back to the default state, which is A for the inventoried flag and SL for the selected flag.

TABLE 1

| Flag | Energized | Not Energized |
|---|---|---|
| S0 inventoried flag | Infinite | N/A |
| S1 inventoried flag | 500 ms-5 s | 500 ms to 5 s |
| S2 inventoried flag | Infinite | Greater than 2 s |
| S3 inventoried flag | Infinite | Greater than 2 s |
| SL selected flag | Infinite | Greater than 2 s |

It can be seen from Table 1 that the persistence time of the S2 inventoried flag, the S3 inventoried flag and the SL selected flag is greater than 2 s, the duration of the S1 inventoried flag is between 500 ms and 5 s, while the S0 inventoried flag has no persistence time (i.e. always in the state A). Therefore, the power-off maintenance time T of the tag can be obtained by measuring the persistence time of the S1 inventoried flag, the S2 inventoried flag, the S3 inventoried flag, and the SL selected flag. Specifically, the S1 inventoried flag, the S2 inventoried flag or the S3 inventoried flag can be set to the state B, and the transition of the inventoried flags from the state B to the state A can be observed after the tag is disabled; or the SL selected flag can be set to the state ~SL, and the transition of the SL selected flag from the state ~SL to the state SL can be observed after the tag is disabled.

Figure 5:
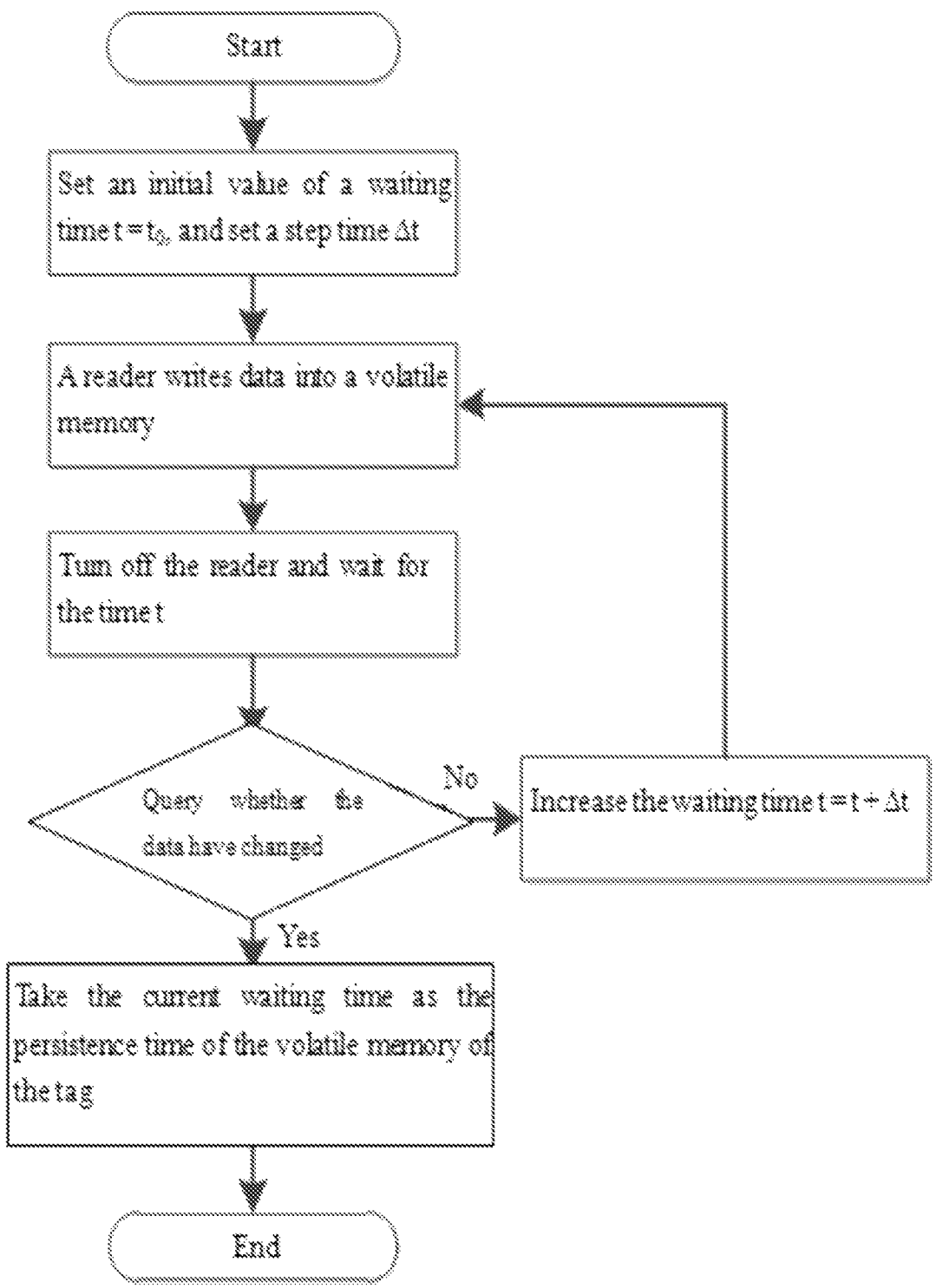
FIG. 5 is a flowchart of a method provided by another example of the present invention for measuring the persistence time of the volatile memory of the tags.

As shown in FIG. 5, a method is further provided in another example of the present invention for measuring the persistence time of the volatile memory of the tag, comprising the following steps:

Data are written by a reader into the volatile memory of the tag, and need to be maintained by charging (i.e. power supply is required for maintenance); the reader is turned off, and waits for a time t before querying the volatile memory for the data: if the data change, the current waiting time is taken as the persistence time of the volatile memory; if the data do not change, the waiting time t is updated with the step time Δt before returning to the operation of writing the data, until the waiting time corresponding to the data change is acquired.

The reader writes data into the volatile memory of the tag and queries the data in the volatile memory both through the communication between the reader and the tag. The specification of the communication between the reader and the tag is described below.

A complete communication process between the reader and the tag is called a cycle; in each cycle, the reader will first select a target tag set from the set composed of all tags according to the requirements, and only communicate with the target tag set to obtain the basic information such as the electronic product code (EPC) of the tag; further, the reader can also perform complex operations such as reading and writing on the tag.

Figure 6:
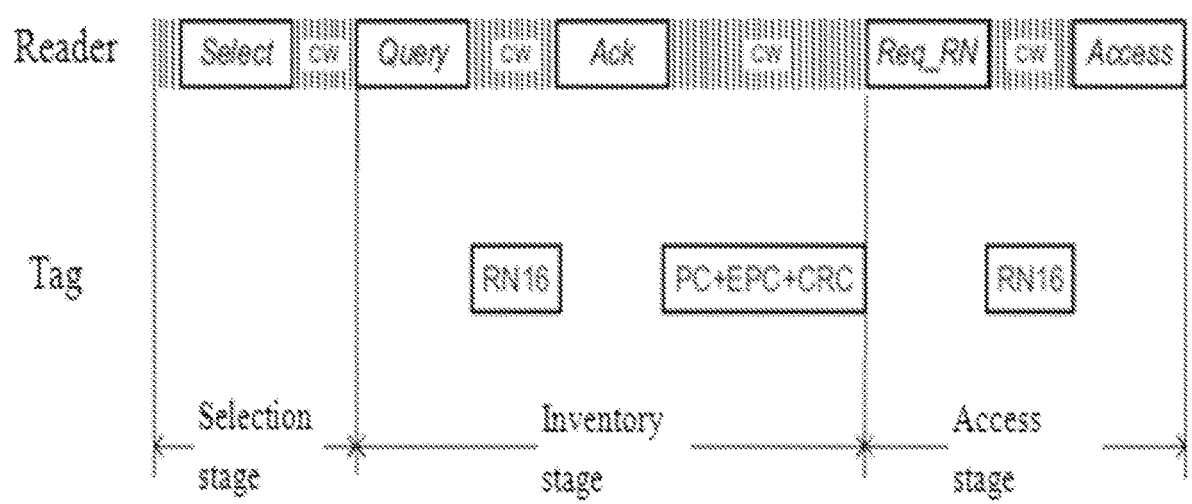
FIG. 6 shows a cycle of communication process between the reader and the tag.

Each cycle of the communication consists of three stages, the selection stage (Select), the inventory stage (Inventory), and the access stage (Access). At each stage, the reader sends the corresponding command, to which the tag replies in response according to its own state. FIG. 6 shows a typical cycle of communication between the reader and the tag. The selection stage and the inventory stage, which are highly relevant to the present invention, are described below.

(1) Selection Stage

The selection stage is the first stage of a cycle of communication between the reader and the tag. At this stage, the goal of the reader is to classify the tag sets into two types, i.e. a matching tag set and a mismatching tag set. By combining the relevant commands in the inventory stage, the target tag set is finally selected and the tags therein will participate in the interaction with the reader in the inventory stage, while the tags that are not selected will remain silent in the later stage without making any responses to the reader.

In the selection stage, there is only one mandatory command Select, which must be implemented by all readers. The structure of the command Select is shown in Table 2.

TABLE 2

| | Command | Target | Action | MenBank | Pointer | Length | Mask | Truncate |
|---|---|---|---|---|---|---|---|---|
| Description | 1010 | 000:S0<br>001:S1<br>010:S2<br>011:S3<br>100:SL | See Table 3 | 00:RFU<br>01:EPC<br>10:TID<br>11:User | Starting position of mask | Length of mask | Mask value | 0: Disable cropping<br>1: Enable cropping |

The command Select has seven domains. Among them six domains are highly relevant to the present invention, and will be described in the following:

Memory bank, pointer, length, and mask

How to select the matching target tag set is determined by four domains, i.e. memory bank (MemBank), pointer (Pointer), length (Length), and mask (Mask). In the command Select, the MemBank specifies the logical memory areas to be compared, and the allowed areas in the command can be EPC Memory, TID Memory and User Memory; the Pointer points to the starting position of the comparison area; and the Length specifies the number of bits of the bit string to be compared. The MemBank, the Pointer and the Length can jointly and uniquely determine a memory bank of the tag; for example, (MemBank=$01_2$, Pointer=32, Length=96) represents a memory bank with a length of 96 bits from the 32nd bit of the selected EPC Memory (i.e. the starting position of the EPC field in the EPC Memory). If the content of the selected memory bank is exactly the same as the mask value (Mask) in the command, the tag matches, otherwise the tag does not match.

Target domain and action domain

After the target tag set matching the mask is selected (the mismatching tag set is also selected), the target domain (Target) and the action domain (Action) jointly specify the action to be performed on the tag set. The target domain in the command Select specifies the session domain to be used by the reader in the communication; for example, Target=$010_2$ indicates that the reader has selected Session S2. In addition to the four session domains, the reader can also use an additional selected flag SL.

The action domain represents the action to be performed on the target flag. See Table 3 for details, in which eight operations are defined. For example, when Target=$010_2$ and Action=$000_2$, the tag set matching the mask will set its own S2 inventoried flag to A, and the tag set mismatching the mask will set its own S2 inventoried flag to B; when Target=$100_2$ and Action=$000_2$, the set matching the mask will set its own selected flag to SL, and the mismatching set will set the selected flag to ~SL; the above actions are symbolized as AB.

TABLE 3

| Action | | Mask matching | Mask mismatching | Symbolic representation |
|---|---|---|---|---|
| Description | 000 | →SL|→A | →~SL|→B | AB |
| | 001 | →SL|→A | Ignorable | A- |
| | 010 | Ignorable | →~SL|→B | -B |
| | 011 | SL⇆~SL|A⇆B | Ignorable | S- |
| | 100 | →~SL|→B | →SL|→A | BA |
| | 101 | →~SL|→B | Ignorable | B- |
| | 110 | Ignorable | →SL|→A | -A |
| | 111 | Ignorable | SL⇆~SL|A⇆B | -S |

In summary, through the joint control of the six fields of MemBank, Pointer, Length, Mask, Target and Action, the reader can divide the tag sets into two types for performing different actions.

(2) Inventory Stage

The reader mainly does the following two jobs in the selection stage: one is to divide the tag sets into two types according to whether the mask matches, and the other is to set the state of the flag of the two types of tags through specified actions. After the command Select, the reader continues to transmit a carrier wave to provide energy for the tag in preparation for the inventory stage.

The inventory stage includes five commands, i.e. $Q$uery, $Q$ueryAdjust, $Q$ueryRep, ACK and NAK, which are all mandatory commands. In the inventory stage, the reader communicates with the tags to obtain the EPC information of all the tags in the target tag set, which is called inventory. After the inventory, the inventoried flag of the tag will flip. That is, the tags are inventoried at most once during a round of the inventory stage.

The typical process of the inventory stage is shown in FIG. 6. The reader first sends the command $Q$uery, and the target tag returns a random number of RN16 by backscattering after receiving the command; after receiving the response of the tag, the reader sends the command ACK with the same RN16 to notify the tag to start transmitting data; after receiving the valid confirmation, the tag sends its own PC, EPC and CRC information to the reader. Through the above process, the reader successfully obtains the information of the tag.

The command $Q$uery means the beginning of a new round of the inventory stage. In addition to specifying the physical layer information to be followed by the tags for response, the complete command $Q$uery, having a total of eight domains, also ultimately determines which tags will participate in the response. The three domains that are highly relevant to the present invention will be described in the following.

Sel domain, session domain, and target domain

On the basis of the command Select, the selection domain (Sel), the session domain (Session), and the target domain (Target) jointly determine the target tag set that actually participates in the response. The session domain (Session) in the command $Q$uery is always consistent with the target domain (Target) in the command Select, indicating the session domain used in this cycle of communication between the reader and the tag, with the value of the session domain being S0, S1, S2 or S3. The selection domain (Sel) in the command $Q$uery indicates the state of the selected flag that the target tag set should have; for example, Sel=$00_2$ indicates that the tag whose selected flag is in the state of SL or ~SL has the opportunity to participate in the response, while Sel=$11_2$ indicates that only the tag whose selected flag is in the state of SL may participate in the response. Similar to the selection domain (Sel), the target domain (Target) in the command $Q$uery further selects the flag of the session domain of the tag; for example, Target=$1_2$ indicates that only the tag whose inventoried flag of the session domain is B may participate in the response. In general, only the tags that match both the selection domain and the target domain in the command $Q$uery can participate in the subsequent inventory. The values of each domain are shown in Table 4.

TABLE 4

| | Command | Sel | Session | Target |
|---|---|---|---|---|
| Description | 1000 | 00:ALL | 00:S0 | 0:A |
| | | 01:ALL | 01:S1 | 1:B |
| | | 10:~SL | 10:S2 | |
| | | 11:SL | 11:S3 | |

To sum up, only by combining the command Select and the command $Q$uery can we really select the target tag set participating in the response, and the remaining tags will remain silent in the inventory stage.

An example of implementing the solution of the present invention based on the command Select and the command $Q$uery will be described specifically in the following.

Later the command Select is written in the following format:

$$S(\underbrace{t}_{\text{Target}}, \underbrace{a}_{\text{Action}}, \underbrace{b}_{\text{Membank}}, \underbrace{p}_{\text{Pointer}}, \underbrace{l}_{\text{Length}}, \underbrace{k}_{\text{Mask}}). \tag{1}$$

Taking the S1 inventoried flag as an example (the S2 inventoried flag, the S3 inventoried flag and the SL selected flag can be operated in a similar way, and only the commands used are slightly different, which will not be detailed here), the reader broadcasts the command Select of the following content, so that the tags whose EPC is id will set the S1 inventoried flag to B, and the other tags will set the S1 inventoried flag to A:

$$\text{Flag} \leftarrow BA\text{:}S(1,4,1,32,96,id) \tag{2}$$

The charging time of the tag should not exceed 2 ms, which is much shorter than the time period for broadcasting the command Select (about 20 ms); in other words, once the command Select in Formula (2) is executed, the inventoried flag of the target tag is set to B and the RC circuit is fully charged.

Then the reader is turned off to make the tag enter the discharge process. After the waiting time t, the reader broadcasts the command $Q$uery to check whether there is a tag whose S1 inventoried flag is B. The command $Q$uery is as follows:

$$\text{Query } B{:}Q \text{ Session=1,Taget=1,} Sel{=}0) \tag{3}$$

If a tag responds, it means that the persistence time of the tag is greater than t. In this case, it is necessary to increase t by a small step time Δt, and then repeat the above selection and query process again until no tag responds (this means that the power is used up and the inventoried flag of the tag has changed to A), so the waiting time at this time is taken as the measurement value of the persistence time of the S1 inventoried flag of the tag.

For the session domain S1, since the persistence time is limited between 500 ms and 5 s, t can be initialized to 500 ms and gradually increased by a step time Δt until there is no tag to respond. The choice of the step time Δt needs to balance the detection accuracy and the detection efficiency: a small Δt will increase the number of trials, resulting in an increase in the time to obtain a single fingerprint, but it can improve the detection accuracy; a large Δt improves the detection efficiency, but the detection accuracy will decrease. In practical application, users can modify the value of Δt according to their needs.

The previous example realizes the acquisition of the persistence time of a single tag within the scope of the reader. In practical situations, it is often necessary to verify multiple tags at once. An intuitive solution is to fingerprint each tag in sequence, which is feasible but inefficient; it only takes a few milliseconds to broadcast the command Select and execute the query operation $Q$uery, with most of the time spent on trying the waiting time t. If multiple tags are allowed to wait at the same time, the execution time will drop sharply. Therefore, in order to improve the authentication efficiency, parallel processing is adopted for the case of multiple tags.

Figure 7:
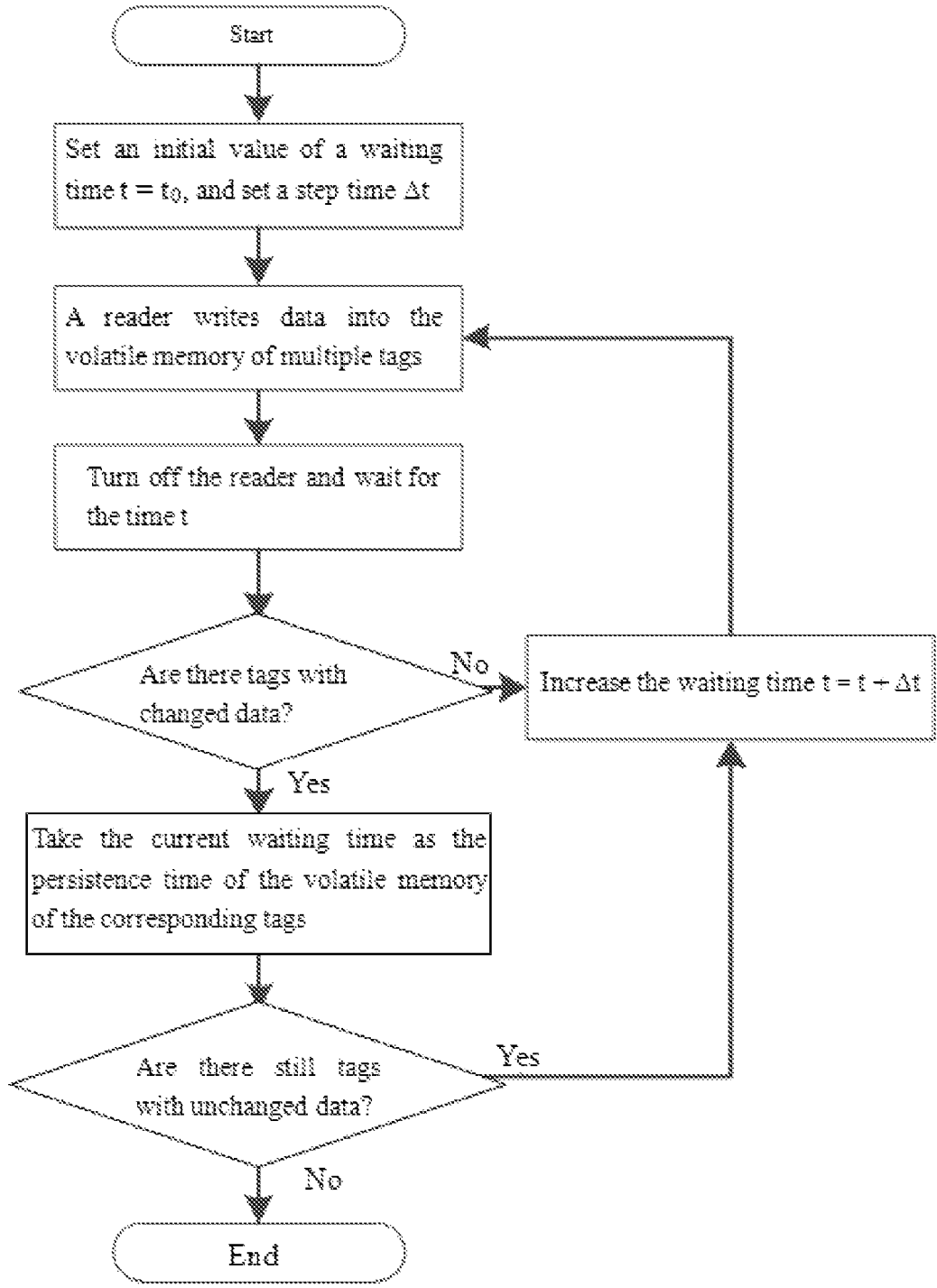
FIG. 7 is a flowchart of a method provided by another example of the present invention for parallelly measuring the persistence time of the volatile memory of multiple tags.

A method for parallel measurement of the persistence time of multiple tags is shown in FIG. 7, comprising the following steps:

Data are written by the reader into the volatile memory of multiple target tags, and need to be maintained by charging;

the reader is turned off, and waits for the time t before querying the volatile memory for the data: if there are tags with changed data, the current waiting time is taken as the persistence time of the volatile memory of the corresponding tags; if there are no tags with changed data, the waiting time t is updated with the step time Δt before returning to the operation of writing the data;

If there are still tags with unchanged data, the waiting time t is updated with the step time Δt before returning to the operation of writing the data, until the persistence time of the volatile memory of all the target tags is acquired.

Taking the inventoried flag as an example, first the inventoried flag of all target tags instead of only one at a time is set to the state B; then these target tags enter the discharge process, which makes the energy gradually consumed; after the waiting time t, the tag whose inventoried flag is B is queried, and if the tag does not respond, its persistence time is the current waiting time t; this process is repeated until all the target tags have been measured.

In this way, the long-time discharge process of the tags can be carried out in parallel, saving a lot of time. As shown by the experiments, if 10 tags need to be fingerprinted, this method can reduce the waiting time by about 90%, and the performance of overall authentication is much higher than that of single authentication.

Specifically, if there are n tags, among which m tags are target tags, the m tags can be separated from the entire tag set by m commands of select:

① $t_l \leftarrow BA{:}S(2,a{=}4,1,32,96,id_l)$

② $t_i \leftarrow B{-}{:}S(2,a{=}5,1,32,96,id_i), i \in [2,m]$ (4)

First, Action=BA is used to set the first tag $t_l$, i.e. the S2 inventoried flag of $t_l$ is set to B, while those of the other tags are set to A; then, for the ith tag $t_i$, Action is set to B−, which sets the S2 inventoried flag of the tag $t_i$ to B but does not change the settings of the other tags.

The measurement method described above requires increasing adjustment of the waiting time t and repeated selection-query operations, which is time-consuming. For example, if the persistence time of the tag is 3 s, the waiting time t is initialized to 0.5 s, and the step time is 0.1 s, the above method needs to iteratively try 0.5 s, 0.6 s, 0.7 s, . . . , 3.0 s, with the sum of all the waiting times being 45.5 s. This is fine for some applications without real-time requirements; however, in some time-critical applications, this time is too long to meet the stringent delay requirements.

The main reason of the time inefficiency is that after updating the waiting t, you need to reset all the tags and try a new waiting time. The efficiency will be greatly improved if the measurement only needs to be made within one waiting time window. After extensive experimentation, it is found that the command query does not charge the tag in the session domain S1; in other words, during the discharge process, you can continue to query the tag after querying the tag without resetting the tag and turning off the reader.

Figure 8:
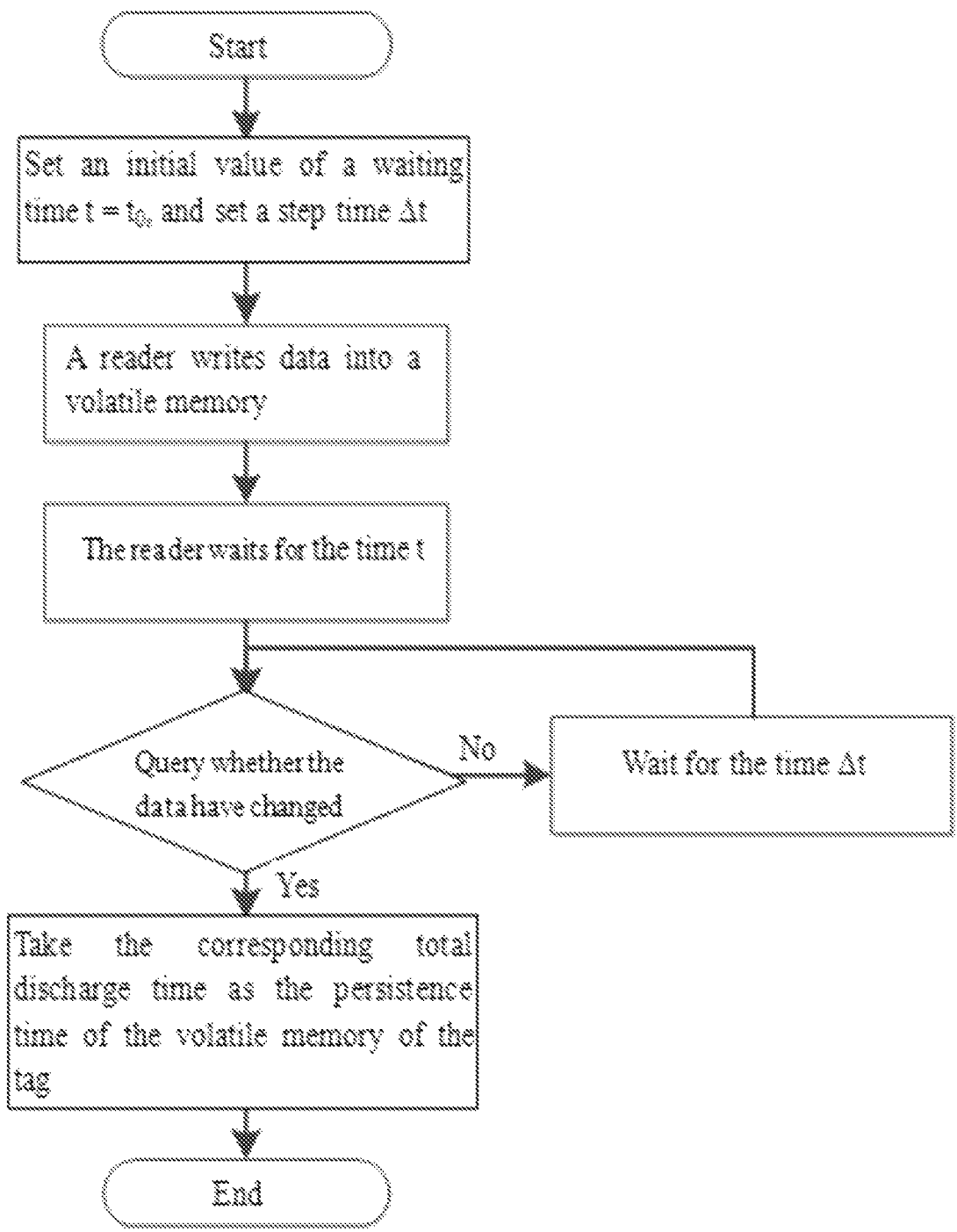
FIG. 8 is a flowchart of a method provided by another example of the present invention for measuring the persistence time of the volatile memory of the tags based on the S1 inventoried flag.

Another method for measuring the persistence time of the tags is shown in FIG. 8, comprising the following steps:

Data are written by a reader into the volatile memory of the tag, and need to be maintained by charging;

the reader queries the volatile memory for the data after waiting for the time t: if the data change, the corresponding total discharge time is taken as the persistence time of the volatile memory; if the data do not change, the reader will query again every time after waiting for the step time Δt until the data change, and the corresponding total discharge time is taken as the persistence time of the volatile memory.

The volatile memory therein is the S1 inventoried flag.

Specifically, the duration of the tag $t_l$ can be measured as follows: First, the reader broadcasts the command Select in Formula (2) to set the S1 inventoried flag of the tag $t_l$ to B; then, the discharge process of the tag begins, and the reader queries the tag whose S1 inventoried flag is A through the following query command:

$$\text{Query } A{:}Q \text{ (Session=1,Taget=0)} \tag{5}$$

During this discharge process, at first the internal RC circuit keeps the S1 inventoried flag in the state of B, and the reader cannot get any response from the tag $t_l$; when the power is too low to keep the information of the volatile memory, the S1 inventoried flag will fall back to the initial state A; at this time, since the reader keeps querying the tag whose S1 inventoried flag is A, the tag $t_l$ that satisfies this condition will respond to the reader, with the time span from the beginning of discharge to the response of the tag being the corresponding total discharge time, i.e. the persistence time of the S1 inventoried flag of the tag $t_l$.

Obviously, this method does not need to try different waiting times, but only needs to measure the persistence time within one time window, thereby saving a lot of time overhead. For example, if the above tag has a persistence time of 3 s, this method makes a huge performance improvement compared to the previous method, reducing the waiting time from 44.5 s to only 3 s.

After responding to the reader, the tag flips its S1 inventoried flag from A to B according to the rules of the standard specification, while the RC circuit is fully charged. By allowing the reader to continue querying A, the tag will respond after another persistence time. Therefore, if multiple measurement values of the persistence time are required, it is only necessary to record the time interval between two consecutive responses of the tag. In fact, the measurement method can also be simplified by deleting the subsequent command Select, i.e. the reader directly enters the inventory stage.

In order to further improve the measurement accuracy of the persistence time, the waiting time t and the step time Δt in FIG. 8 can be set to 0; that is, after completing the operation of writing data, the reader continuously queries the data state without any waiting; at this time, the time interval for obtaining the data state is only the time required to execute the command, which will improve the measurement accuracy of the persistence time. Of course, in order to reduce consumption, appropriate waiting time t and step time Δt can also be set.

Figure 9:
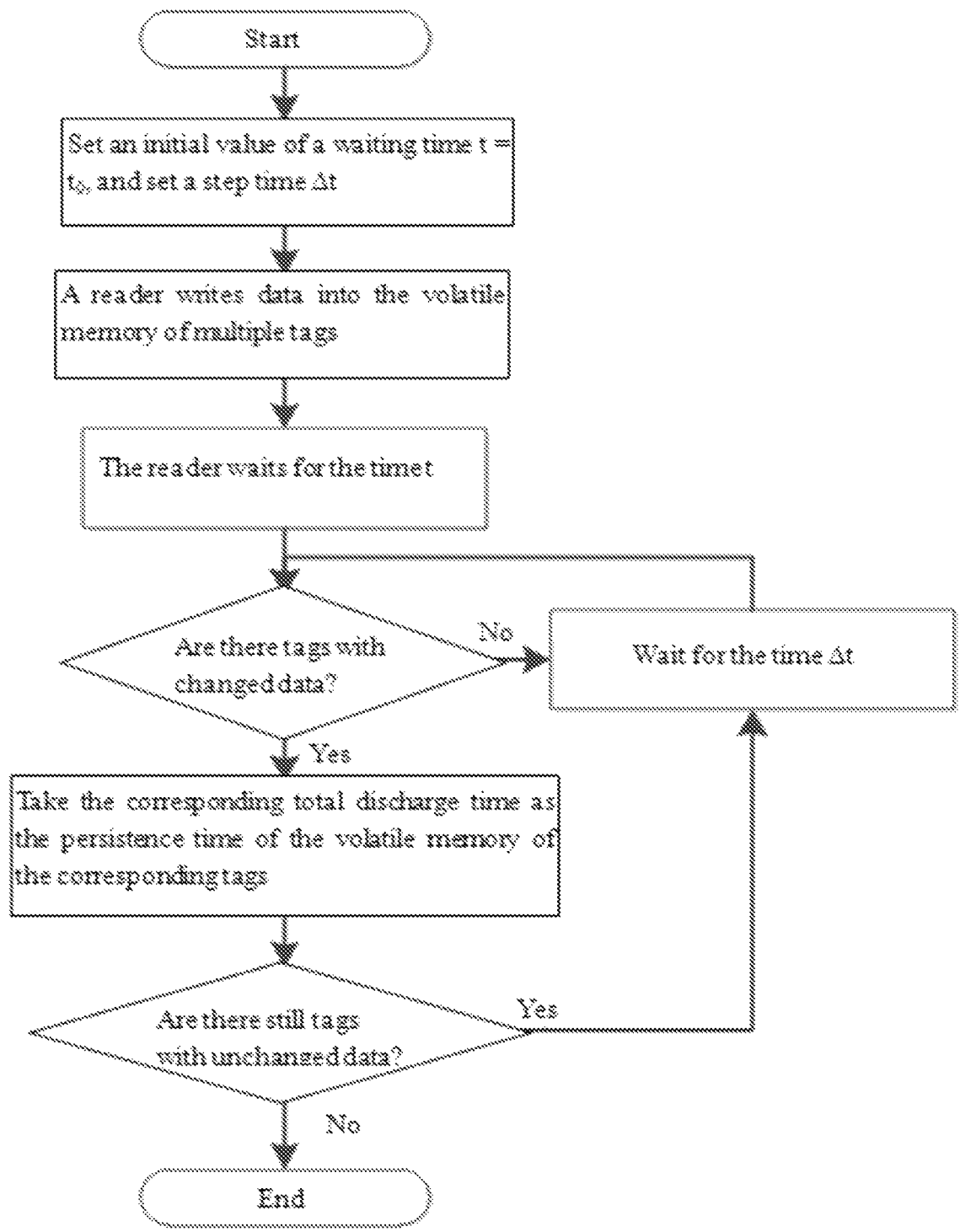
FIG. 9 is a flowchart of a method provided by another example of the present invention for parallelly measuring the persistence time of the volatile memory of multiple tags based on the S1 inventoried flag.

In addition, this measurement method can also be easily extended to the multi-tag situation. A method for parallel measurement of the persistence time of multiple tags based on the S1 inventoried flag is shown in FIG. 9, comprising the following steps:

Data are written by the reader into the volatile memory of multiple target tags, and need to be maintained by charging;

the reader queries the volatile memory for the data after waiting for the time t: if there are tags with changed data, the corresponding total discharge time is taken as the persistence time of the volatile memory of the corresponding tags; if there are no tags with changed data, the reader will query again every time after waiting for the step time Δt;

if there are still tags with unchanged data, the reader will query again every time after waiting for the step time Δt, until the persistence time of the volatile memory of all the target tags is acquired.

The volatile memory therein is the S1 inventoried flag.

For the previous improved measurement method, due to the query of the tags whose inventoried flag is A, non-target tags may have a negative impact on the measurement of the persistence time, especially when the number of the non-target tags is large. More specifically, if there is a tag set $\tau$, and $\tau'(\tau' \subseteq \tau)$ is a set of tags to be authenticated, $\tau-\tau'$ represents the set of tags other than the tags to be authenticated in the tag set $\tau$; when the command Select is used to set the S1 inventoried flag of the tags in $\tau'$ to B and the S1 inventoried flag of the tags in $\tau-\tau'$ to A, if subsequently the reader queries the tags whose S1 inventoried flag is A, the tags in $\tau-\tau'$ will participate in the response, such that the response of the tags in $\tau'$ will not be acquired by the reader in time. Initially setting the S1 inventoried flag of the tags in $\tau-\tau'$ to B also does not work, because these tags will also participate in the response when the S1 inventoried flag of these tags falls back to A.

In order to solve the above problem, the S1 inventoried flag and the selected flag SL can be used in combination to eliminate the interference of the tags in $\tau-\tau'$. This is specifically implemented as follows: the selected flag of the tags in $\tau'$ is set to SL, while the selected flag of the tags in $\tau-\tau'$ is set to ~SL; and only the tags with the SL flag are allowed to participate in the response in the inventory stage.

In this way, even the tag whose S1 inventoried flag is A in $\tau-\tau'$ must remain silent on the command to query the tag whose S1 inventoried flag is A. Specifically, assuming $\tau'=\{t1, t2, \ldots, tm\}$, the reader broadcasts the selection command Select as follows:

(1) $t_l \leftarrow AB:S(t=4,0,1,32,96,id_l)$, (j) $t_i \leftarrow A-:S(t=4,1,1,32,96,id_i), i \in [2,m]$ \hfill (6)

First, the selected flag of the tag $t_l$ is set to SL, while the selected flag of the other tags is set to ~SL; then, the selected flag of the ith tag $t_i$ is set to SL, but the settings of the other tags will not be changed. Thus, the selected flag of the tags in $\tau'$ is set to SL, while the selected flag of the tags in $\tau-\tau'$ is set to ~SL.

Afterwards, the command query is used to enter the inventory stage:

Query $A$ & $SL$:$Q$ (1,Target=0,Sel=3) \hfill (7)

The reader queries the tags whose inventoried flag is A in S1, and only the tags whose selected flag is SL participate in the response. In this case, only the tags in $\tau'$ have the opportunity to respond. For any target tag, the time interval between two adjacent responses is recorded, and used as the persistence of the S1 inventoried flag of the tag and then as the fingerprint of the tag.

In the previous measurement methods, the persistence time of one volatile memory is used as the tag fingerprint. It is easy to understand that if the persistence times of multiple volatile memories are used as different tag fingerprints to be compared respectively, the tag is determined to be a genuine tag only when the different tag fingerprints are determined to be consistent, which will inevitably increase the authentication accuracy of the tags. The authentication accuracy of the tags has been verified by experiments for the following three fingerprint combinations: only S1 inventoried flag, S1 inventoried flag+S3 inventoried flag, and S1 inventoried flag+S2 inventoried flag+S3 inventoried flag. As shown in Table 5, the authentication accuracy increases with the number of different fingerprints; when three different fingerprints are used at the same time, the authentication accuracy reaches 99.40%.

TABLE 5

|  | S1 | S1 + S3 | S1 + S2 + S3 |
| --- | --- | --- | --- |
| Accuracy | 97.35% | 98.32% | 99.40% |

It can be seen that, with the solution of the present invention, a commercial tag has several independent persistence times (different RC circuits), which form different fingerprints to jointly authenticate the tag, so that the tag is difficult to be forged.

Figure 10:
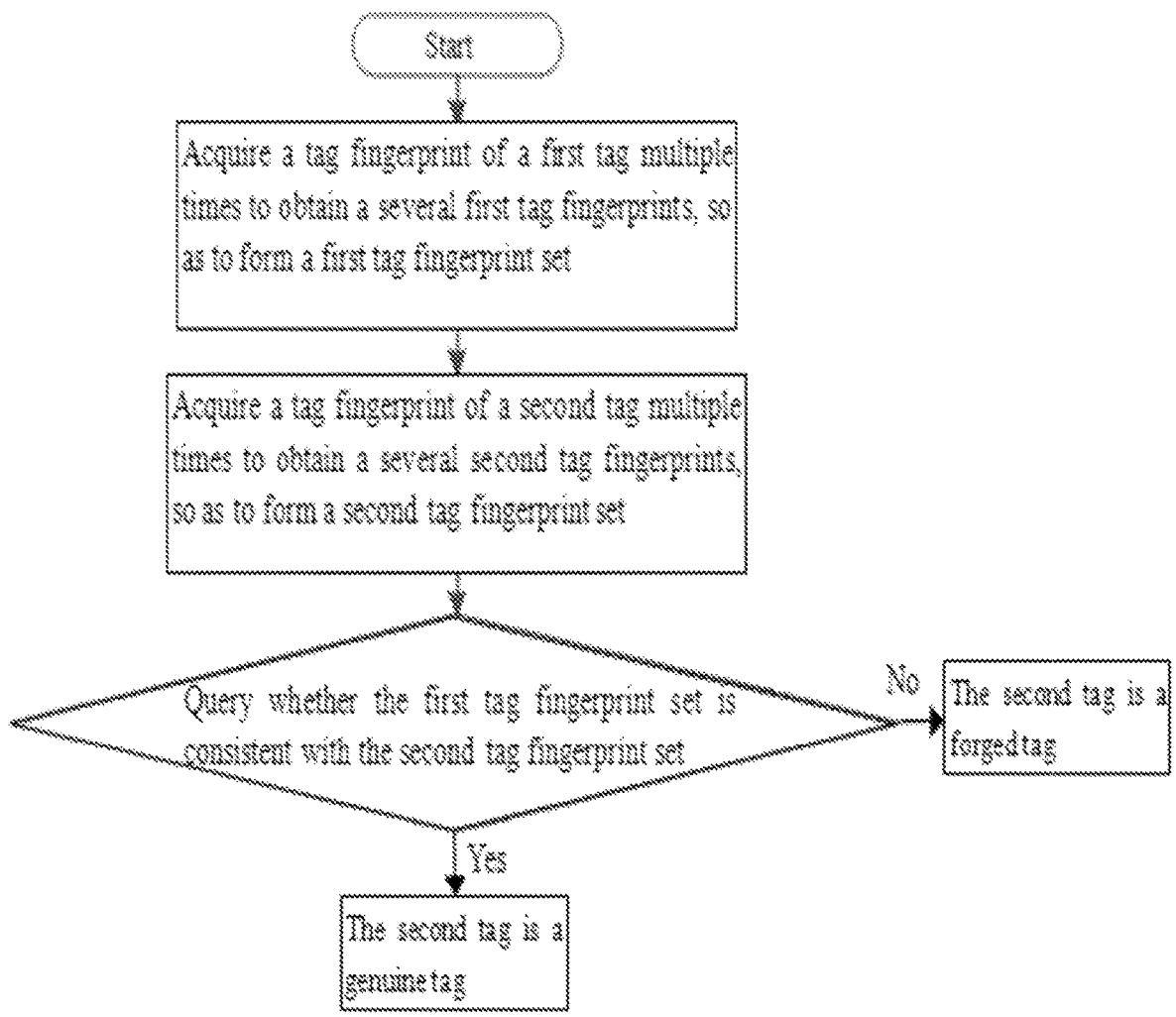
FIG. 10 is a flowchart of a method provided by another example of the present invention for verifying the authenticity of the tags using a fingerprint set.

It is found by experiments that the tag fingerprint characterized by the persistence time has a certain jitter in the actual measurement; using one fingerprint of a genuine tag to verify the authenticity of the tag to be authenticated may have a high misjudgment rate; a genuine tag may be judged as a forged tag because of the jitter of the fingerprint measurement value, and a forged tag may also be judged as a genuine tag because of the jitter of the fingerprint measurement value. In order to prevent the jitter of a single fingerprint from affecting the authentication accuracy, the present invention uses a fingerprint set to verify the authenticity of the tag in an example, as shown in FIG. 10. This authentication method specifically comprises the following steps:

Acquiring the tag fingerprint of a first tag multiple times to obtain a several the first tag fingerprints, so as to form a first tag fingerprint set; acquiring the tag fingerprint of a second tag multiple times to obtain several the second tag fingerprints, so as to form a second tag fingerprint set; comparing the first tag fingerprint set with the second tag fingerprint set: if the first tag fingerprint set is consistent with the second tag fingerprint set, determining that the second tag is a genuine tag, otherwise determining that the second tag is a forged tag.

In order to ensure the authentication accuracy, the number of fingerprints in the first tag fingerprint set and the second tag fingerprint set shall not be less than three.

Figure 11A:
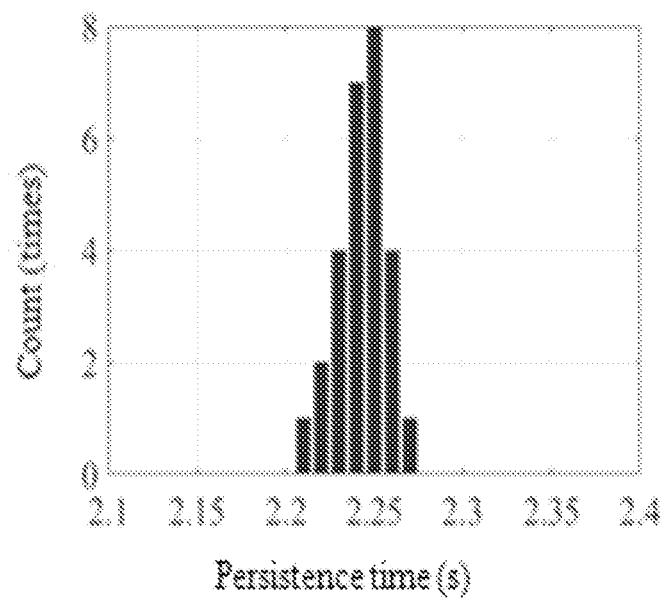
FIG. 11(a) is a distribution diagram of measurement data of multiple tag fingerprints of the same tag.
Figure 11B:
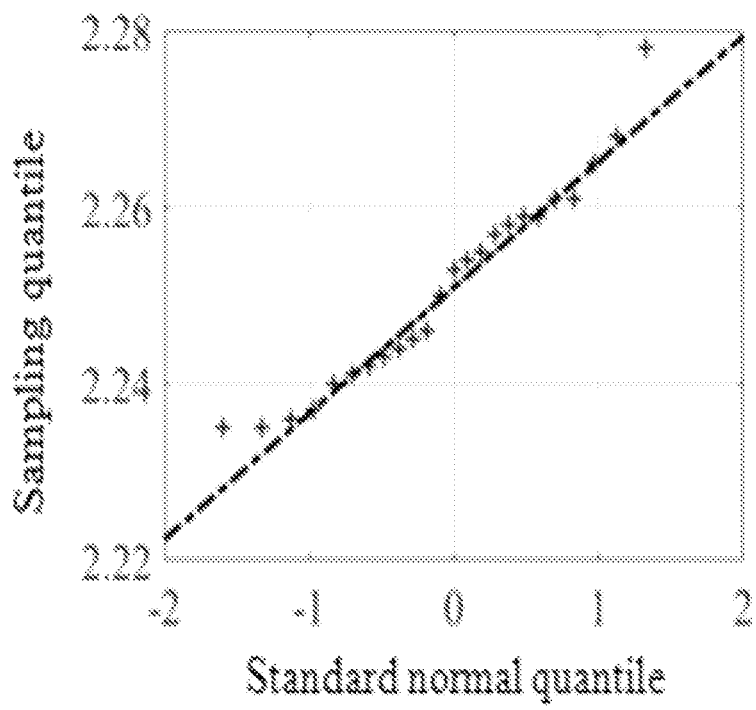
FIG. 11(b) is a Q-Q diagram of the tag fingerprint distribution and the standard normal distribution.

FIG. 11(a) shows the data of 27 tag fingerprints collected for the same tag. It can be seen that the tag fingerprints approximately obey a Gaussian distribution, which can be further verified by a Q-Q plot (quantile-quantile plot). The Q-Q plot is widely used to compare the similarity between two probability distributions, and if the two probability distributions are similar, the points in the Q-Q plot will be almost on the same line. As shown in FIG. 11(b), by comparing the distribution of the persistence time with the standard normal distribution, the points in the Q-Q plot almost form a straight line, which indicates that the tag fingerprints characterized by the persistence time follow a Gaussian distribution. Here, if the first tag fingerprint set and the second tag fingerprint set follow the similar Gaussian distribution, it means that the two tag fingerprint sets come from the same tag (i.e. they are consistent), otherwise the two tag fingerprint sets come from different tags (i.e. they are inconsistent).

A t-test can be specifically used to compare whether the first tag fingerprint set is consistent with the second tag fingerprint set. In the field of statistics, the t-test (Student's t test) is a commonly used method to compare whether two Gaussian distribution samples are similar. Specifically, after the first tag fingerprint set and the second tag fingerprint set are inputted, the t-test will return a similarity evaluation value between 0 and 1. With a threshold set for the similarity evaluation value, if the similarity evaluation value is less than the threshold, the first tag fingerprint set and the second tag fingerprint set are considered to follow different distributions and thus be inconsistent; if the similarity evaluation value is greater than or equal to the threshold, the first tag fingerprint set and the second tag fingerprint set are considered to follow the same distribution and thus be consistent.

Figure 12:
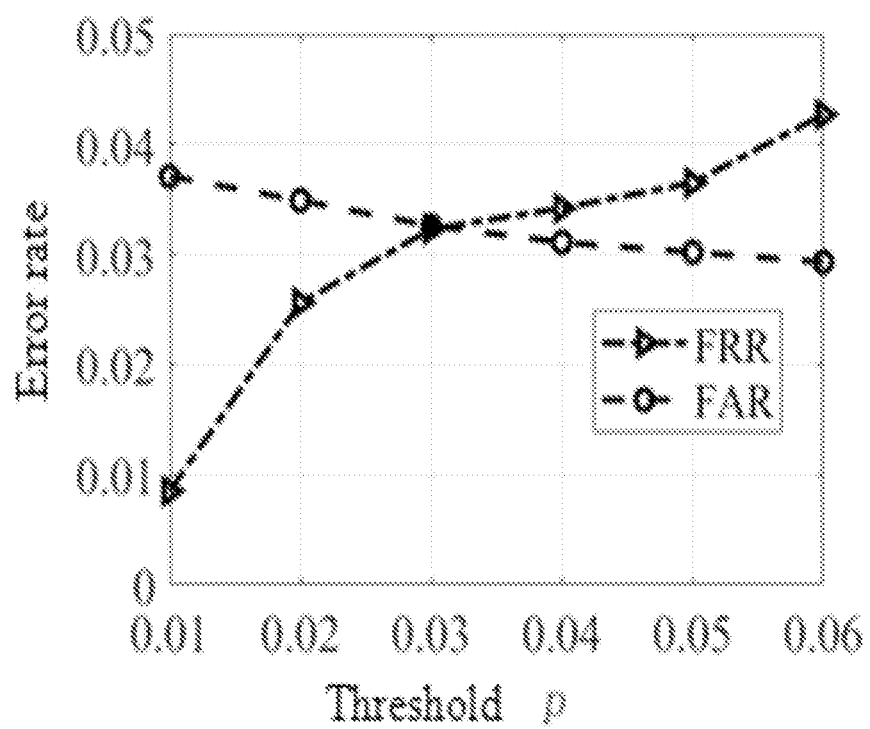
FIG. 12 is a graph of FRR and FAR with respect to the threshold.

It is necessary to consider the balance between FRR (False Reject Rate) and FAR (False Accept Rate) for the selection of the aforementioned threshold, wherein FRR represents the possibility that a genuine tag is mistaken for a forged tag, while FAR represents the possibility that a forged tag is mistaken for a genuine tag. A high threshold will make people tend to think that the two distributions are inconsistent, resulting in a high FRR, while a low threshold will make it difficult to distinguish different tag fingerprint distributions, resulting in a high FAR. In order to achieve a balance between FRR and FAR, an optimal threshold is determined at the intersection of the FRR and FAR versus threshold curves. FIG. 12 shows a FRR-threshold curve and a FAR-threshold curve obtained experimentally. When FFR is equal to FAR, the optimal threshold is obtained, which is specifically 0.03 in FIG. 12.

In addition to using the t-test to judge the consistency between the first tag fingerprint set and the second tag fingerprint set, other parametric tests or non-parametric tests can also be used, such as the Mann-Whitney U test; alternatively, the mean of the elements in the first tag fingerprint set can be directly compared with the mean of the elements in the second tag fingerprint set, e.g., comparing the absolute value of the difference between the two means with a threshold, comparing the ratio of the absolute value of the difference between the two means to the first tag fingerprint set mean with a threshold, and so on.

When there are multiple genuine tag, the tag fingerprint (or fingerprint set) of the tag to be authenticated can be compared with the tag fingerprints (or fingerprint sets) of the genuine tags one by one; if there is a consistent situation, the tag to be authenticated is a genuine tag, otherwise it is a forged tag. In order to improve the authentication efficiency of the tags, the feature of tag ID can be added; with both the tag ID and the tag fingerprint regarded as the feature of the tag, the tag ID is authenticated first, and then the tag fingerprint is further authenticated when the tag has passed the authentication of the tag ID.

Figure 13:
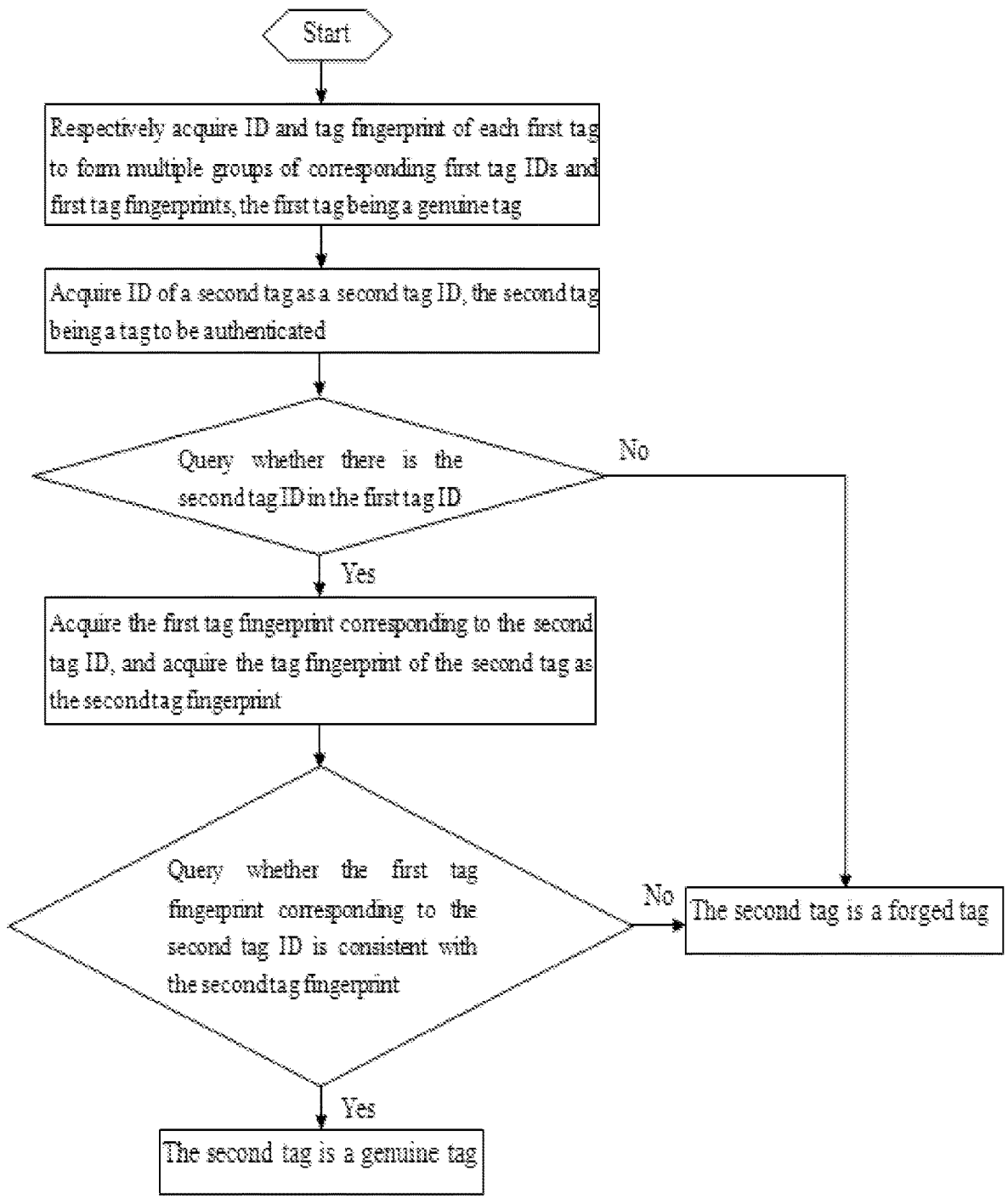
FIG. 13 is a flowchart of a method provided by another example of the present invention for authenticating the passive RFID tags, wherein the tag ID and the tag fingerprint are used as the feature of the tags.

FIG. 13 shows an example of the present invention in which the tag ID and the tag fingerprint are used as the feature of a tag. In this example, the ID and the tag fingerprint (or tag fingerprint set) of each first tag are respectively acquired to form multiple groups of the corresponding first tag IDs and first tag fingerprints (or first tag fingerprint sets); the ID of the second tag is acquired as a second tag ID; it is determined whether there is the second tag ID in the first tag ID before comparison of the tag fingerprints: if there is not, the second tag is determined to be a forged tag, otherwise the first tag fingerprint (or the first tag fingerprint set) corresponding to the second tag ID is acquired and compared with the second tag fingerprint (or the second tag fingerprint set).

Specifically, the reader obtains the tag ID (e.g., EPC) through the reply of the tag, and obtains the fingerprint or fingerprint set through the aforementioned method, and then stores the tag ID and the fingerprint (or fingerprint set) as a feature pair into the database. When the authenticity of the tag needs to be verified, if the tag to be authenticated has passed the ID authentication, the unique corresponding real fingerprint or real fingerprint set can be found in the database according to the ID of the tag to be authenticated.

Figure 14:
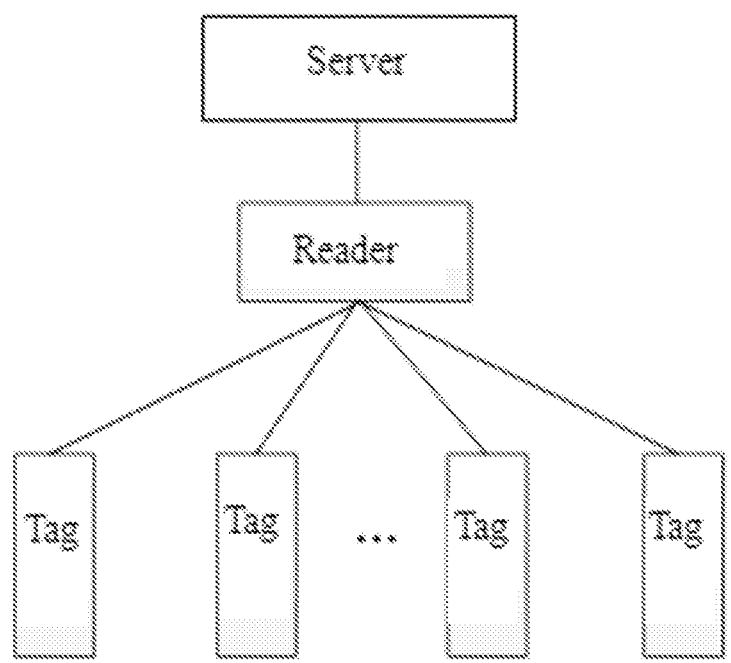
FIG. 14 is a schematic diagram of a device provided by an example of the present invention for authenticating the passive RFID tags.

FIG. 14 is a schematic diagram of a device provided by the present invention for authenticating the passive RFID tags. The device includes a reader and a server, wherein the server can communicate with the reader so that the aforementioned tag authentication method can be implemented.

The server can be a computer system such as a notebook computer or a desktop computer. Java, for example, can be used in the server as the development software for the development of the control program and the user interface. Specifically, the server can use the Low Level Reader Protocol (LLRP) specified in the relevant standards to communicate with the reader.

It can be seen that the authentication method of the present invention does not require any modification to the hardware or firmware of the tag and reader, but only needs to communicate with the reader by using the server with the relevant authentication program.

At this point, those skilled in the art will recognize that, although various examples of the present invention have been shown and described in detail herein, many other variations or modifications consistent with the principle of the present invention may be directly determined or deduced from the present disclosure without departing from the spirit and scope of the present invention. Accordingly, the scope of the present invention should be understood and deemed to cover all such other variations or modifications.

The invention claimed is:

1. A method for authenticating passive RFID (radio frequency identification) tags, characterized in that the method comprises the following steps:
   acquiring a tag fingerprint of the first tag as the first tag fingerprint, where the first tag is the genuine tag;
   acquiring a tag fingerprint of the second tag as the second tag fingerprint, where the second tag is the tag to be authenticated; and
   comparing the first tag fingerprint with the second tag fingerprint: if the first tag fingerprint is consistent with the second tag fingerprint, determining that the second tag is a genuine tag, otherwise determining that the second tag is a forged tag;
   wherein the first tag fingerprint and the second tag fingerprint are power-off maintenance time enabling the passive RFID tags to operate normally during the discharging phase after fully charging.

2. The authentication method according to claim 1, characterized in that: the power-off maintenance time is determined by measurement of a persistence time of a volatile memory of the first tag or the second tag.

3. The authentication method according to claim 2, characterized in that a method for measuring the persistence time comprises the following steps:
   data are written by a reader into the volatile memory of the first tag or the second tag, and need to be maintained by charging; and
   the reader is turned off, and waits for a time t before querying the volatile memory for the data: if the data change, the current waiting time is taken as the persistence time of the volatile memory; if the data do not change, the waiting time t is updated with the step time Δt before returning to the operation of writing the data, until the waiting time corresponding to the data change is acquired.

4. The authentication method according to claim 2, characterized in that the method for measuring the persistence time comprises the following steps:
   data are written by the reader into the volatile memory of multiple target tags, and need to be maintained by charging;
   the reader is turned off, and waits for the time t before querying the volatile memory for the data: if there are tags with changed data, the current waiting time is taken as the persistence time of the volatile memory of the corresponding tags; if there are no tags with changed data, the waiting time t is updated with the step time Δt before returning to the operation of writing the data; and
   if there are still tags with unchanged data, the waiting time t is updated with the step time Δt before returning to the operation of writing the data, until the persistence time of the volatile memory of all the target tags is acquired.

5. The authentication method according to claim 2, characterized in that the method for measuring the persistence time comprises the following steps:
   data are written by a reader into the volatile memory of the first tag or the second tag; and
   the reader queries the volatile memory for the data: if the data change, the corresponding total discharge time is taken as the persistence time of the volatile memory; if the data remains unchanged, the reader keeps querying the first tag or the second tag until the data change, and the time span is treated as the persistence time of the first tag or the second tag;
   wherein the volatile memory therein is the S1 inventoried flag.

6. The authentication method according to claim 2, characterized in that the method for measuring the persistence time comprises the following steps:
   data are written by the reader into the volatile memory of multiple target tags;
   the reader queries the volatile memory for the data: if there are target tags with changed data, the corresponding total discharge time is taken as the persistence time of the volatile memory of the corresponding target tags; if there are no target tags with changed data, the reader keeps querying the target tags; and
   if there are still tags with unchanged data, the reader will repetitively query, until the persistence time of the volatile memory of all the target tags is acquired;
   wherein the volatile memory therein is the S1 inventoried flag.

7. The authentication method according to claim 2, characterized in that: if the persistence times of multiple different volatile memories of the first and second tags are used as different tag fingerprints to be compared respectively, the second tag is determined to be a genuine tag only when the different tag fingerprints are determined to be consistent.

8. The authentication method according to claim 1, characterized in that the method comprises the following steps:
   acquiring the tag fingerprint of the first tag multiple times to obtain several fingerprints of the first tag, so as to form a first tag fingerprint set;
   acquiring the tag fingerprint of the second tag multiple times to obtain several fingerprints of the second tag, so as to form a second tag fingerprint set;
   comparing the first tag fingerprint set with the second tag fingerprint set: if the first tag fingerprint set is consistent with the second tag fingerprint set, determining that the second tag is a genuine tag, otherwise determining that the second tag is a forged tag.

9. The authentication method according to claim 8, characterized in that: for the comparison between the first tag fingerprint set and the second tag fingerprint set, a t-test or a Mann-Whitney U test may be used, or the mean of the elements in the first tag fingerprint set can be directly compared with the mean of the elements in the second tag fingerprint set.

10. The authentication method according to claim 1, characterized in that the method comprises the following steps:
    Respectively acquiring ID and tag fingerprint of each first tag to form multiple groups of corresponding first tag IDs and first tag fingerprints;
    acquiring the ID of the second tag as a second tag ID; and
    determining whether there is the second tag ID in the first tag ID before comparing the first and second tag fingerprints: if there is not, determining that the second tag is a forged tag, otherwise acquiring the first tag fingerprint corresponding to the second tag ID and comparing it with the second tag fingerprint.

11. The authentication method according to claim 8, characterized in that the method comprises the following steps:
    respectively acquiring the ID and tag fingerprint set of each first tag to form multiple groups of corresponding first tag IDs and first tag fingerprint sets;

acquiring the ID of the second tag as a second tag ID; and determining whether there is the second tag ID in the first tag ID set before comparing the first and second tag fingerprints: if there is not, determining that the second tag is a forged tag, otherwise acquiring the first tag fingerprint set corresponding to the second tag ID and comparing it with the second tag fingerprint set.

12. A device for authenticating passive RFID tags, characterized in that: the device includes a reader and a server, wherein the server communicates with the reader so that the device is adapted for performing the authentication method according to claim 1.

* * * * *